United States Patent [19]

Ryan et al.

[11] Patent Number: 5,587,877

[45] Date of Patent: Dec. 24, 1996

[54] COMPUTER ORGANIZER ENCLOSURE AND METHOD

[75] Inventors: Thomas P. Ryan; Glen A. Stelzer, both of Schiller Park, Ill.

[73] Assignee: Amco Engineering Co., Schiller Park, Ill.

[21] Appl. No.: 329,462

[22] Filed: Oct. 26, 1994

[51] Int. Cl.$^6$ ........................................................ H05K 7/14
[52] U.S. Cl. ........................ 361/683; 361/724; 312/223.2
[58] Field of Search .................................... 361/724–727, 361/679, 683, 685, 687, 608, 616; 364/708.1; 312/223.1, 223.2, 223.3; G06F 1/16

[56] References Cited

U.S. PATENT DOCUMENTS

| | | | |
|---|---|---|---|
| 4,479,198 | 10/1984 | Romano et al. ........................ | 361/687 |
| 4,614,383 | 9/1986 | Polley et al. ............................ | 312/273 |
| 4,690,286 | 9/1987 | Horne et al. ............................ | 361/724 |
| 5,040,095 | 8/1991 | Beaty et al. ............................ | 361/724 |
| 5,277,615 | 1/1994 | Hastings et al. ........................ | 439/377 |
| 5,306,079 | 4/1994 | Liu .......................................... | 361/724 |
| 5,311,440 | 4/1994 | Hess, Jr. .................................. | 364/481 |
| 5,349,132 | 9/1994 | Miller et al. ............................ | 361/800 |

*Primary Examiner*—Leo P. Picard
*Assistant Examiner*—Lynn D. Feild
*Attorney, Agent, or Firm*—Dominik & Stein

[57] ABSTRACT

An organizer structure which has a one-piece chassis which includes the bottom and two sides desirably formed by bending a single sheet of metal to form the U-shaped chassis is disclosed. Thereafter, a spacer is positioned above the bottom of the chassis to provide for mounting a whole host of components. Forwardly of the chassis is an enclosure access frame. The frame contains two side-by-side openings which are in open communication with removable storage devices. The storage devices are housed in a removable housing, each of which is positioned adjacent the other to present the storage devices through the opening in the frame. A total of six such devices can be housed, each set of three being easily removable from the confines of the organizer by removing its housing.

19 Claims, 7 Drawing Sheets

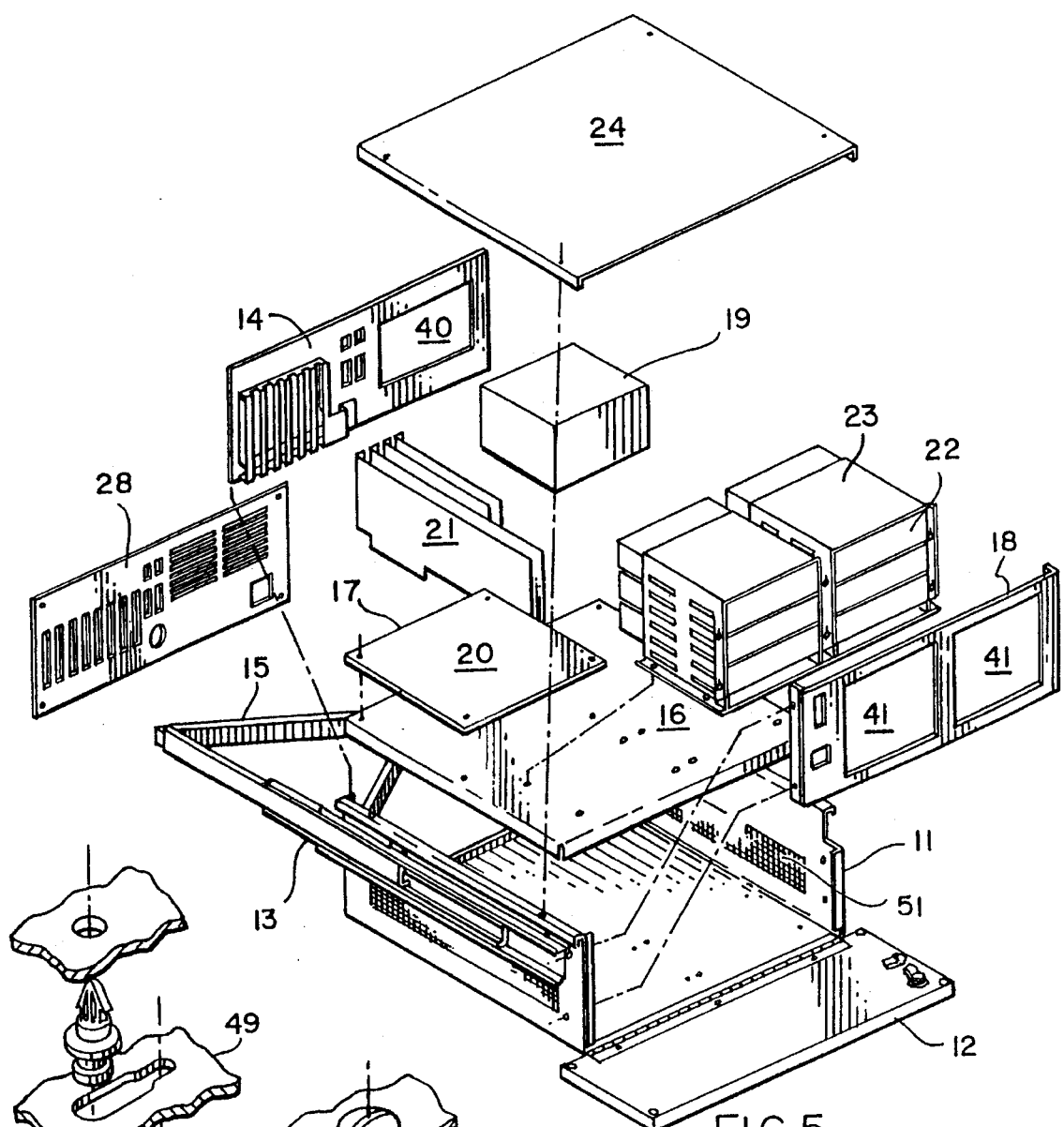
FIG. 5
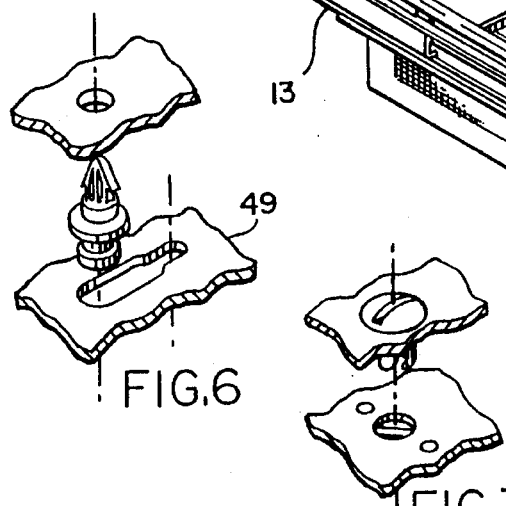
FIG. 6
FIG. 7
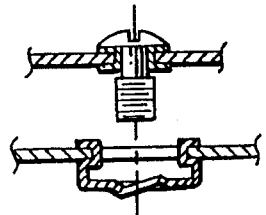
FIG. 8
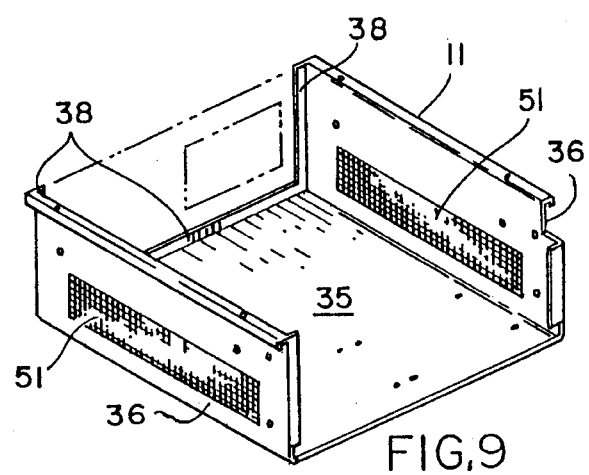
FIG. 9

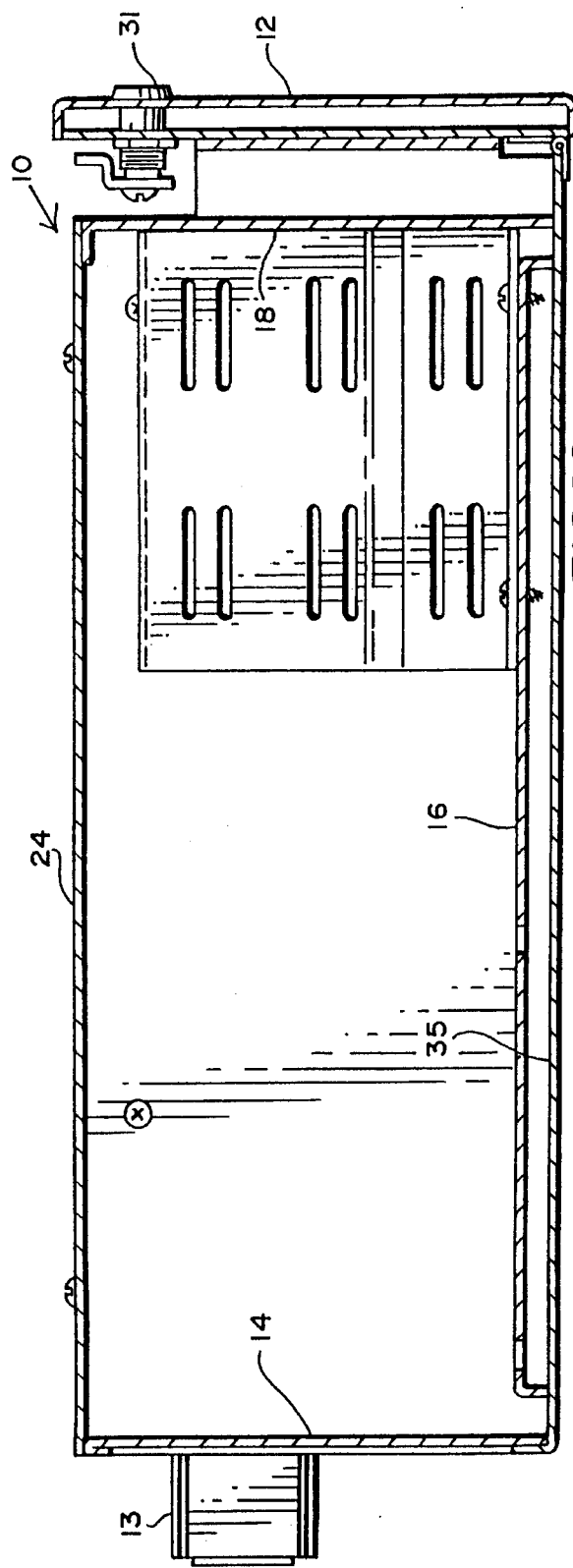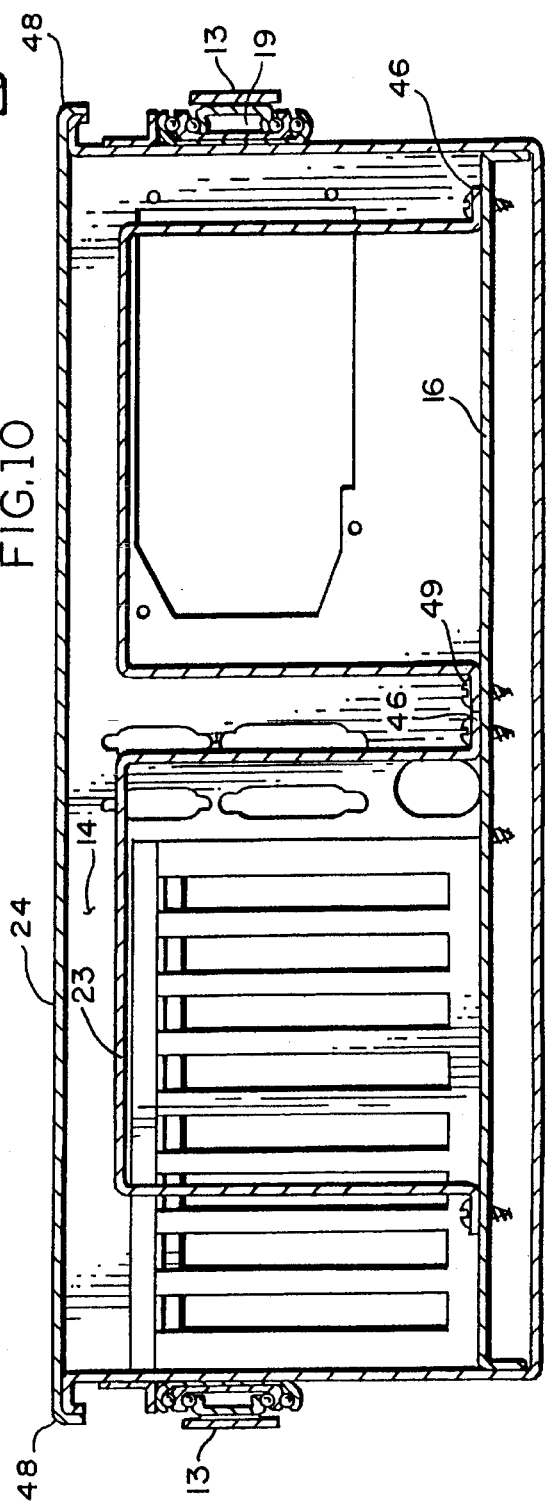

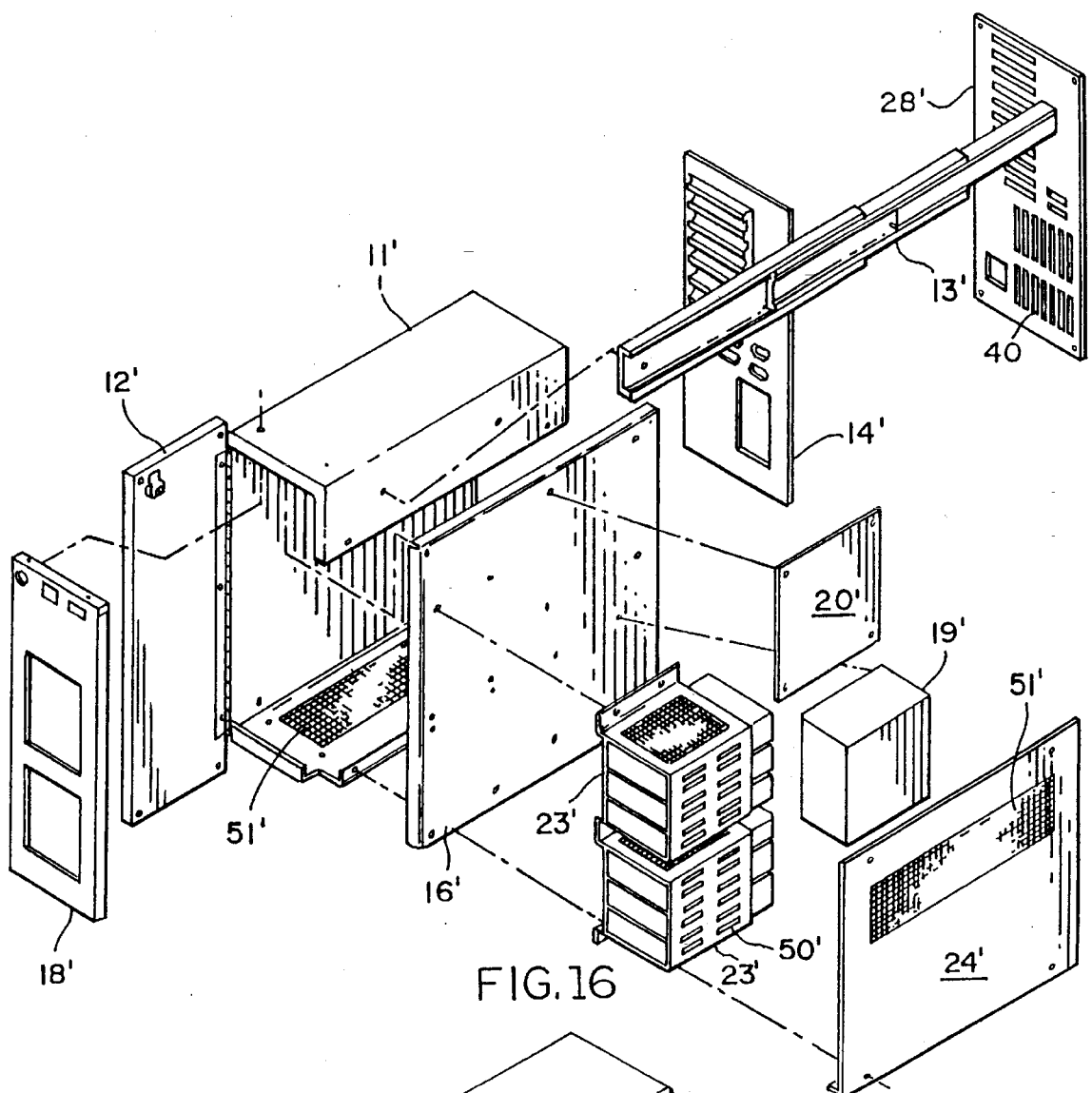
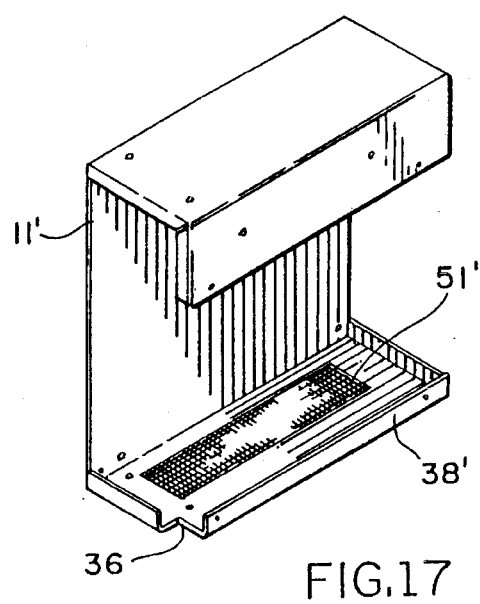

COMPUTER ORGANIZER ENCLOSURE AND METHOD

FIELD OF THE INVENTION

The present invention is directed to a computer organizer enclosure and method which in one embodiment, finds utility in any drawer of a desk having a width that will accommodate a 19" electronic standard recessed unit or otherwise accommodate EIA standards. This dimension will accommodate a nineteen inch electronic standard recessed unit.

BACKGROUND OF THE INVENTION

Computer systems vary from manufacturer to manufacturer, and user to user. In the more complete form, they will contain drives for either a hard disc or a floppy; a connection to mother board and daughter boards, a further connection to a power supply, and then a final connection to outside members which either feed data to the computer and its assemblies, or receive data for presentation whether by a visual screen or a printed form.

The typical computer user, whether secretary, engineer, professional, or other sits at a desk and invariably wants to minimize the physical equipment on the desk in order to arrange files and other media for processing through the computer. Thus it is highly desirable to eliminate those pieces of the computer system from the user's desk or work place and organize them in a convenient location which is highly accessible by the operator, and immediately accessible by service personnel. Moreover, if it is this accessible, it is highly likely that down time will be minimized and field repairs by way of component interchange facilitated.

A further factor to consider with computer usages and particularly the drives, whether floppy or hard disc, is to maintain them in a relatively dust-free environment. In addition to being relatively dust free, the environment desirably is ventilated and shielded against exterior contamination, agitation, and the like.

SUMMARY OF THE PRIOR ART

Various examples in the patent literature of attempts at modularizing and collecting electronic elements are illustrated n U.S. Pat. Nos. 4,755,009; 5,199,773; 4,491,375 and 4,600,249.

SUMMARY OF THE INVENTION

The present invention derives from an organizer structure which has a one-piece chassis which includes the bottom and two sides desirably formed by bending a single sheet of metal to form the U-shaped chassis. Thereafter, a spacer is positioned above the bottom of the chassis to provide for mounting a whole host of user preselected components. Forwardly of the chassis is an enclosure access frame. The frame contains two side-by-side openings which are in open communication with auxiliary storage devices. The storage devices are housed in a removable housing, each of which is positioned adjacent the other to present the storage devices through the opening in the frame. A total of six such devices can be housed, each set of three being easily removable from the confines of the organizer by removing its housing. In this manner the front of the storage devices are accessible to the user for the insertion of removable media. At the front of the chassis bottom an elongate hinge secures an access panel proportioned to cover the entire open end of the enclosure to shield the same from dust, and maximize security. To the rear of the two drive housings provision is made for mounting a mother board in spaced relationship on the spacer, daughter boards being inserted therein, with a power supply opposite the mother board. The power supply invariably has a blower and therefore the agitation of the air will be to the rear of the drives and exit outwardly from a rear interface panel. The two storage device housings are removably secured to the spacer and to the enclosure access forms thereby securely encapsulating the same irrespective of whether the organizer is used in a horizontal or vertical orientation. Similarly the components are held in a removably secured fashion each in optimized relationship to the other, and as dictated by the needs of the particular system. The method of the present invention contemplates the removable assembly being positioned in a closure to the end that the computer components are oriented front to rear in the sequence of drives, circuitry, power supply, and electronic interface with the balance of the system. One embodiment of the organizer is the horizontal and other vertical. In each embodiment an imperforate top shields the interior from settling dust.

In view of the foregoing it is a principle object of the present invention to provide for security of computer components in a confined organizer which serves as an enclosure.

Yet another object of the present invention looks to the minimization of the work space mandated by a computer system having several components to the end that the operator or end user is isolated from those portions of the computer system which are not necessary for physical attention or manipulation.

Yet another object of the present invention is to provide an enclosure which, while securing all of the components of the computer system, is immediately accessible for service personnel, or for the operator to perform simple service functions by way of removing and testing certain components.

A further advantage of the present invention looks to the provision of an aesthetically attractive computer organizer enclosure when the same is manufactured in the form of a drawer for use in a typical opening in a desk or other work station environment.

Yet another object of the present invention is to provide an organizer of computer components into a system which is highly durable, and yet inherently economical to form and fabricate as well as facilitating easy storage.

Another object of the present invention is to provide a method of sequentially organizing computer components in direct relationship to each other for an optimized spacial as well as electronic relationship. Moreover, a plurality of the subject organizer, whether horizontal or vertical, can be utilized in various combinations.

BRIEF DESCRIPTION OF THE ILLUSTRATIVE DRAWINGS

Further objects and advantages of the present invention will become apparent as the following description of an illustrative embodiment proceeds, taken in conjunction with the accompanying drawings, in which:

FIG. 5 is an exploded perspective view showing the various components of the organizer;

FIG. 6 is an exemplary view of a fastener and keyhole slot employed in securing elements of the organizer in place;

FIG. 7 is yet another alternative fastener, and like FIG. 6, permanently secured to one component of the organizer;

FIG. 8 is a sectional view of the fastener shown in FIG. 7;

FIG. 9 is a perspective view of the chassis which is the foundation element of the organizer;

FIG. 10 is a longitudinal transverse view of the organizer taken along section lines 10—10 of FIG. 4;

FIG. 11 is a transverse sectional view of the organizer taken along section line 11—11 of FIG. 4;

FIG. 16 is an exploded perspective partially diagrammatic view of the vertical organizer to compare with a comparable view of the horizontal organizer shown in FIG. 5; and FIG. 17 is a perspective view of the chassis of the vertical organizer of FIG. 16.

DESCRIPTION OF A PREFERRED EMBODIMENT

Figure 1:
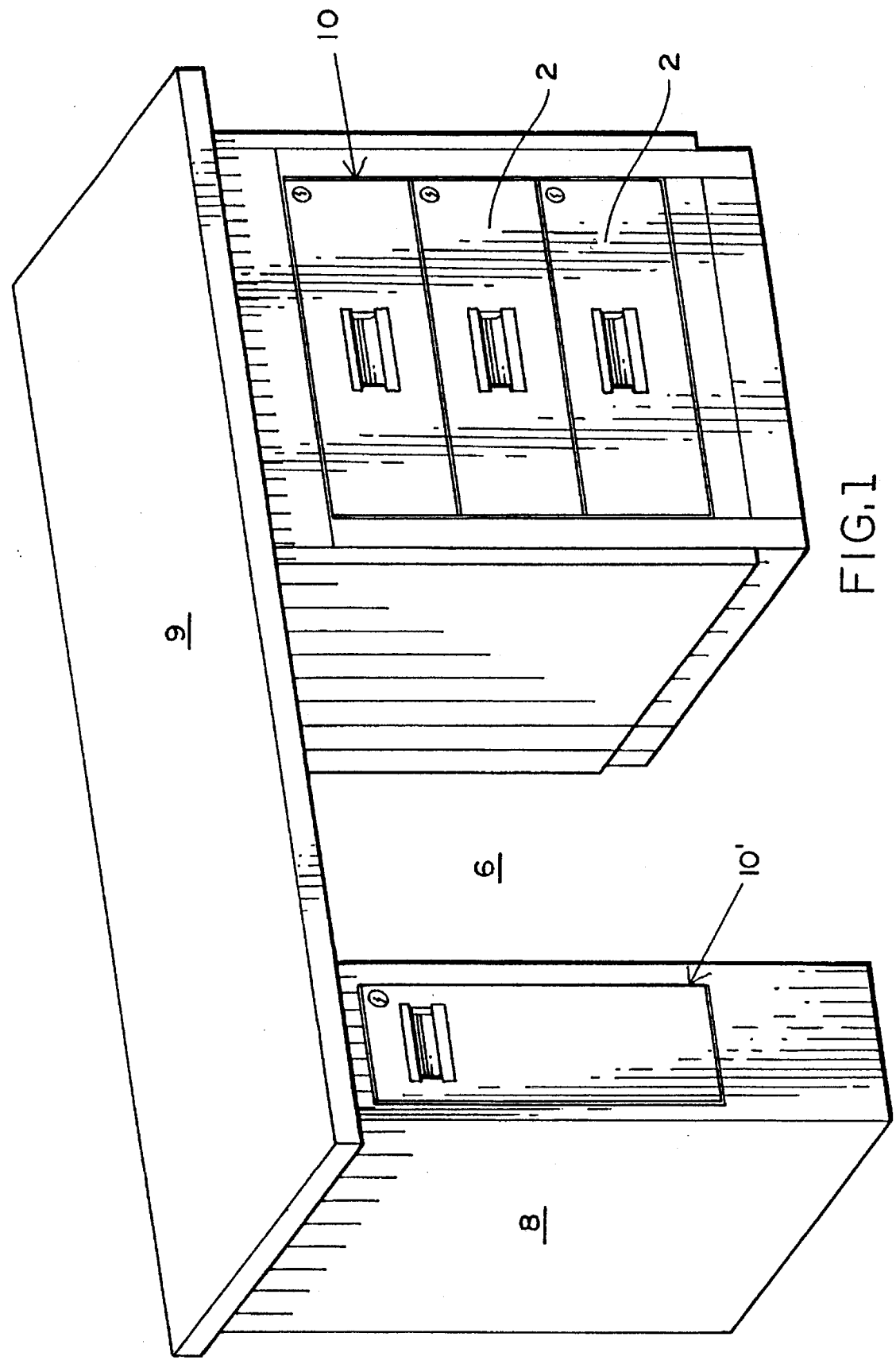
FIG. 1 is a perspective essentially front elevation of a desk in which two embodiments of the subject organizer are shown in their secured mode.
Figure 2:
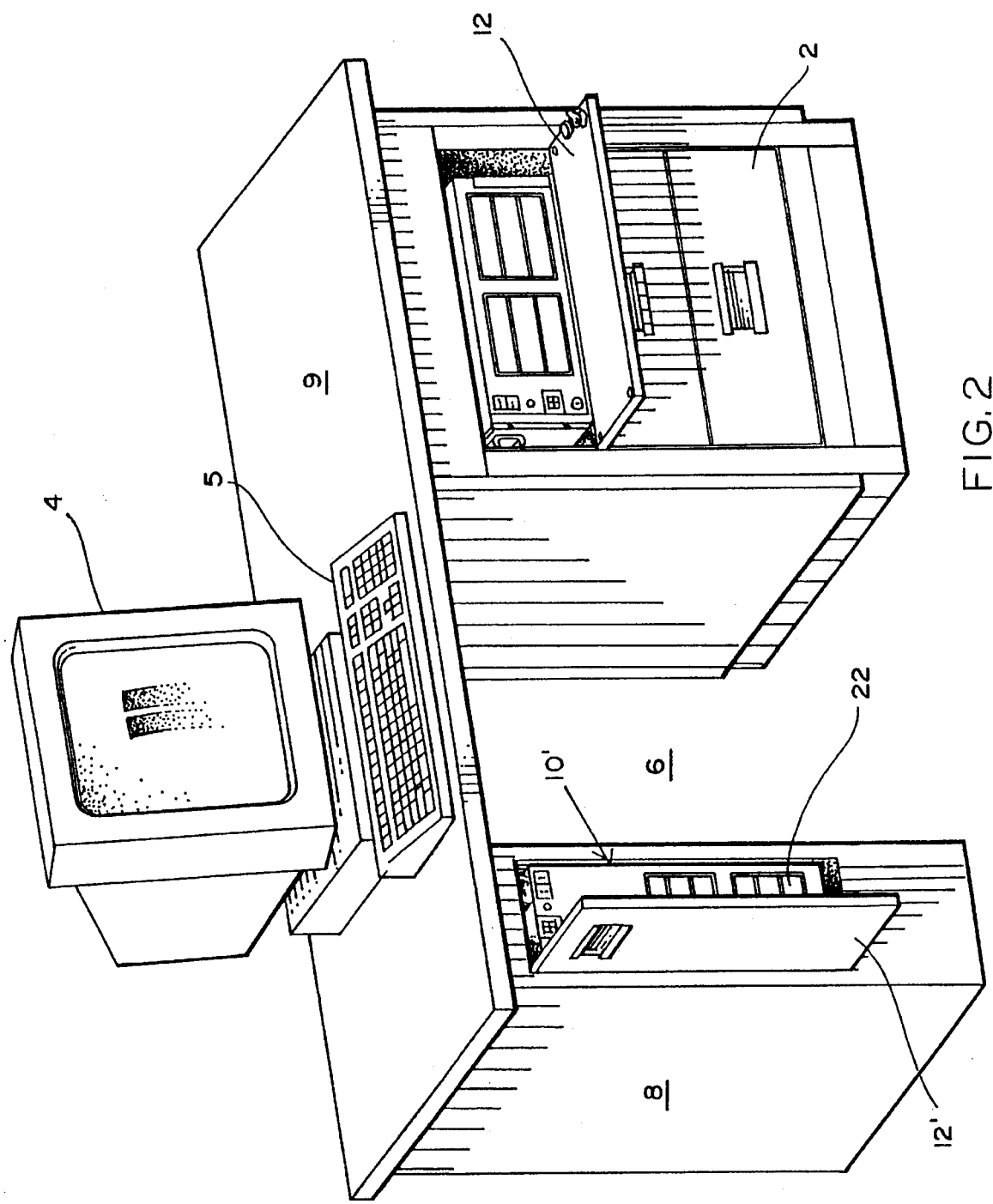
FIG. 2 is a view from the same vantage point as FIG. 1 but showing the computer key board, monitor, on top of the desk and with the two exemplary organizers shown in their access position.

The environment for the organizer 10 of the subject invention is illustrated in a desk 1 such as shown in FIG. 1 having a plurality of drawers 2, and a top 9 on which (as shown in FIG. 2) a monitor 4 and keyboard 5 is positioned. To be noted here is that there is a distinct lack of clutter on top 9 of the desk 1 which is attributable to the compartmentalization and orderly compaction of parts in the organizer 10. A vertical stand 8 is to the left-hand side of the knee hole 6 of the desk 1, and contains a vertical organizer 10'. Hereinafter when the vertical organizer 10' is the subject of reference, the reference numerals will bear a prime designation where the parts are common with the original preferred embodiment which is the horizontal configuration of the organizer 10 as shown in FIGS. 1 and 2.

The organizers 10, 10' are reached by opening the access panel 12, 12' revealing interiorly a plurality of auxiliary storage devices 22. In this respect it should be noted that the auxiliary storage devices 22 of both the horizontal organizer 10 and the vertical organizer 10' are identical. They are accessed in the horizontal configuration for loading of discs and whatever service equipment is necessitated.

Figure 3:
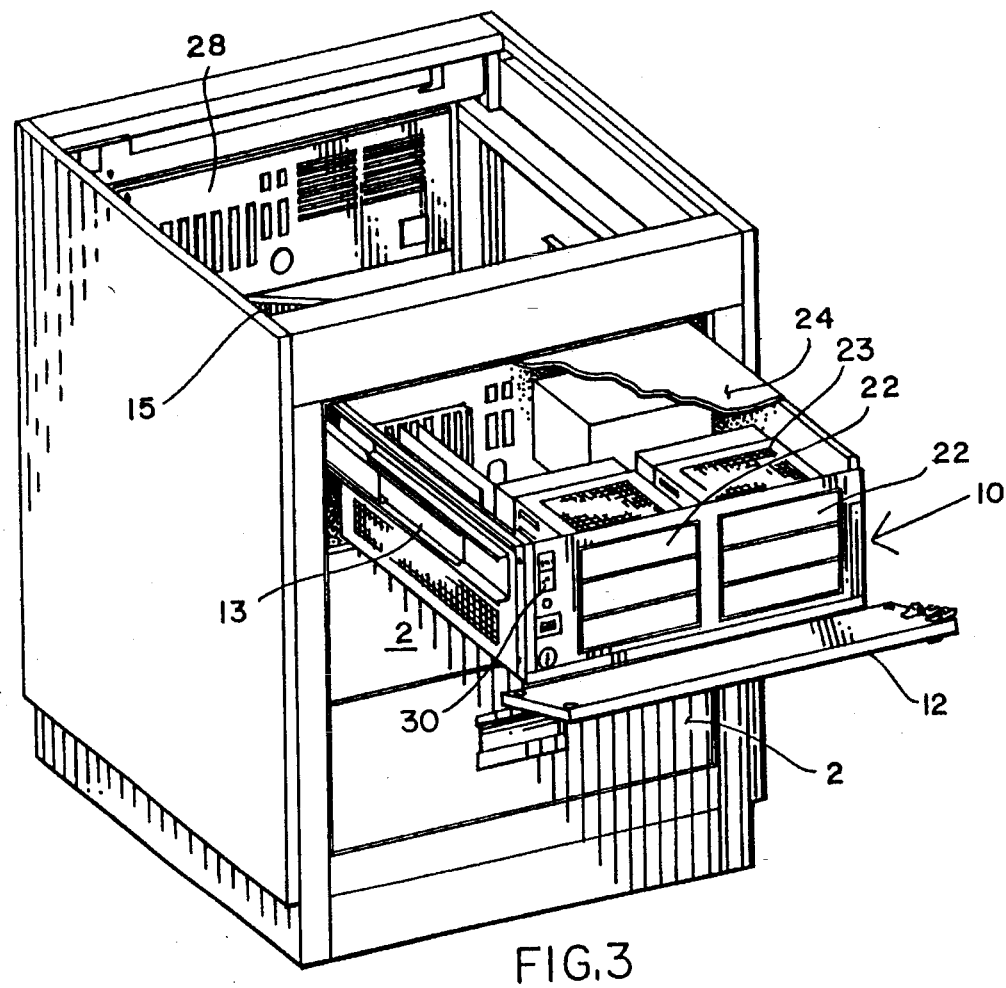
FIG. 3 is a perspective view of the right-hand side of the desk broken on the top and with the organizer pulled out for access and service.
Figure 4:
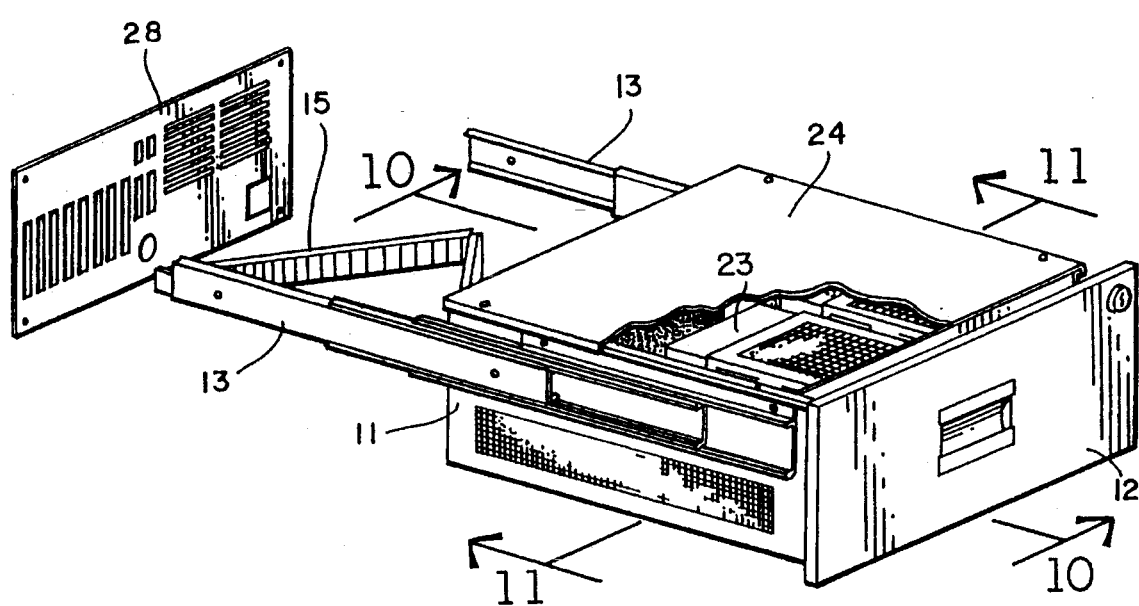
FIG. 4 is a perspective view of the organizer itself including the cable mount arm assembly and rear interface panel.

FIGS. 3 and 4 demonstrate more of the elements involved in the organizer 10. FIG. 3 shows the telescopic slides 13 which secure the lateral edges of the horizontal organizer 10 to the desk 1. In addition, FIG. 5 shows the rear interface panel 14 which concludes the rear portion of the organizer 10. As shown in FIG. 4, the slides 13 coordinate with a cable mount arm assembly 15 which assists in preventing snarling of the cables that are used to connect with the rear interface panel 14. Turning now to FIG. 9, it will be seen that the chassis 11 is folded to form a chassis bottom 35 which has two sides 36. Flanges 38 are provided at the rear portion of the chassis 11 to engage the rear interface panel 14.

Now the relationship of the parts as shown in the exploded view in FIG. 5 becomes more apparent. The chassis 11 is central to the presentation of the computer components as well as the balance of the organizer 10. More particularly, it should be noted that a spacer 16 is provided which is a flat surface spaced from the bottom 35 of the chassis 11. The purpose of the spacer will become more and more meaningful as the description proceeds since it provides extra space interiorly of the organizer 10 in which to mount various portions of the computer assemblage. The auxiliary storage devices 22 are secured interiorly of the storage device housing 23. Each of the housings 23 is tubular, (see FIGS. 15, 16, and 17), and secured at the lower portion to the spacer 16 by means of the removable fastener such as illustrated in FIGS. 6, 7, and 8.

Means are provided for securing the power supply 19 to the rear interface panel 14. The power supply 19, since it is ventilated by means of a blower, is secured so that the exhaust from the blower will exhaust rearwardly from the power supply aperture 40 in the rear interface panel 14. Adjacent the power supply 19 and spaced therefrom is the circuit assembly 17 which includes a mother board 20 and a daughter board 21 in their various predetermined relationships. The rear interface panel 14 has the cables which secure to the mother board 20 and daughter board 21 as well as communicate with the auxiliary storage device 22 which is housed in the housing 23.

An enclosure frame 18 is secured to the front lateral edges of the chassis 11, also by means of fasteners such as illustrated in FIGS. 6, 7, and 8. It will be seen that the enclosure frame 18 has a pair of auxiliary storage device access openings 41, and spaced to access the power switch 30. The cover 24 sits atop the entire assembly of the computer organizer 10 and, along with the rear interface panel 14 and the enclosure frame 18 surround all of the computer elements. The entire assembly is secured by means of the access panel 12 which is hingedly secured at its lower edge to the bottom 35 of the chassis 11. It is locked in place with a security key positioned at the discretion of the manufacturer.

Now by reference to FIG. 10, it will be seen that the enclosure 12, as discussed above, utilizes a security lock 31 at its upper portion to engage a lateral edge of the chassis 11 when locked. The enclosure frame 18 is immediately behind the access panel 12. The spacer 16 is shown clearly in its spaced relationship to the bottom 35 of the chassis 11. Particularly to be noted at the right-hand portion of FIG. 10, are the removable screws 45 which secure the housing 23 for the auxiliary storage devices 22 without penetrating the bottom 35 of the chassis 11. In this manner, the risk of snarling with other elements is minimized by encapsulating between the spacer 16 and the chassis bottom 35 all of those projections necessary to penetrate the spacer and secure the various elements of the computer assembly interiorly of the organizer 10 and above the bottom 35 of the chassis 11.

FIG. 11 shows even more dramatically how the spacer 16 assists in mounting the various elements of the computer assembly. At the right-hand portion, the power supply 19 is shown, and the two housings 23 for the auxiliary storage device are illustrated, and showing how their lower flanges 46 spread outwardly for securement by means of fasteners 49 to the spacer 16. The patch panel 28 shows the various ports for patching through with the cable connectors, and the telescopic slides 13 are shown in their relationship to the chassis sides 36 to secure the entirety of the assembly inside the desk 1. Also to be noted is the lateral flange J-shaped interface 48 between the cover 24 and the capture mounting screws 25 which normally pass through the keyway-type 49 fastening system of FIG. 6. In this manner the top can be easily engaged by feel. Similarly, the housing 23 for auxiliary storage devices may be secured to the spacer 16.

Figure 12:
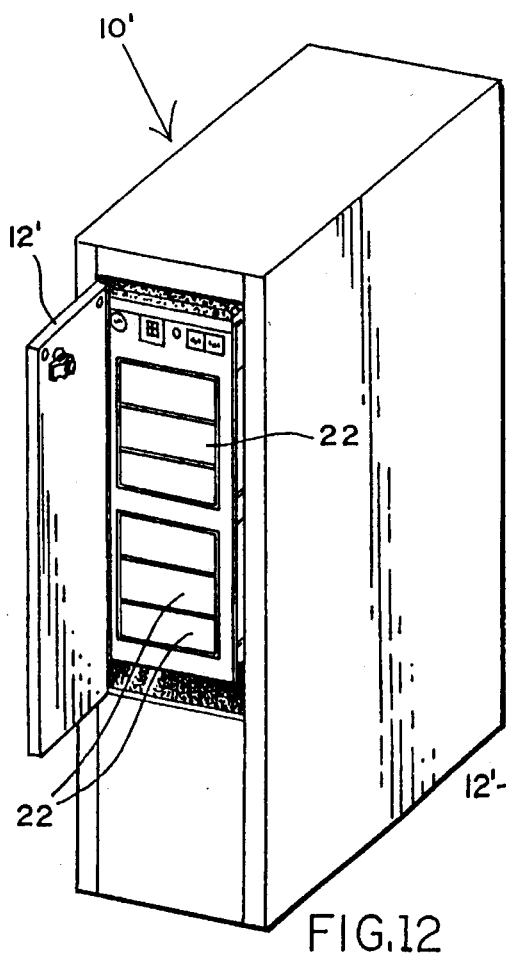
FIG. 12 is a perspective view of the vertical organizer showing the access panel open and the auxiliary storage devices.
Figure 13:
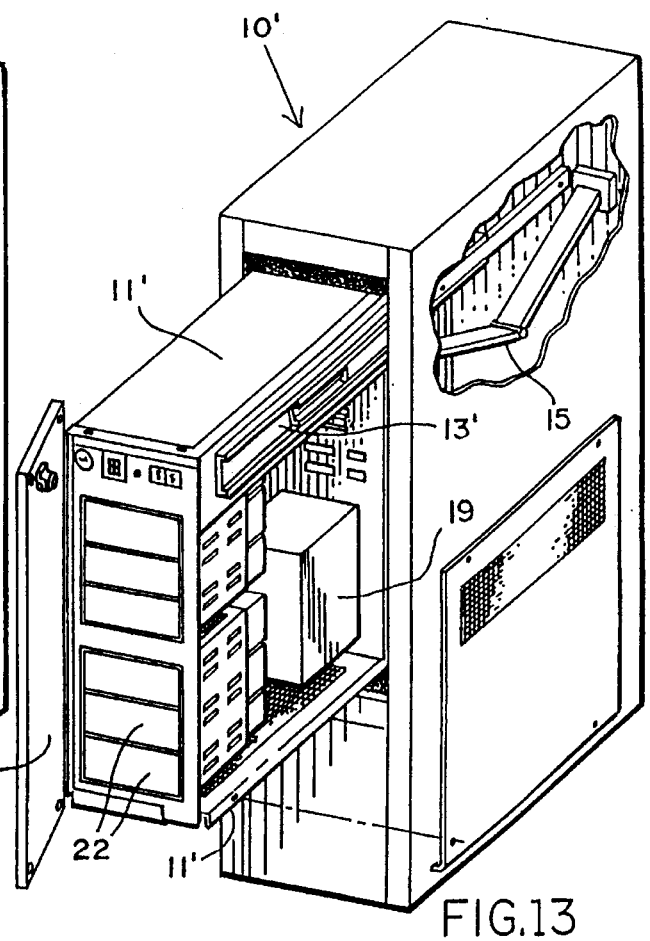
FIG. 13 is a view of the organizer of FIG. 12 but showing the entire organizer as removed on a sliding track.
Figure 14:
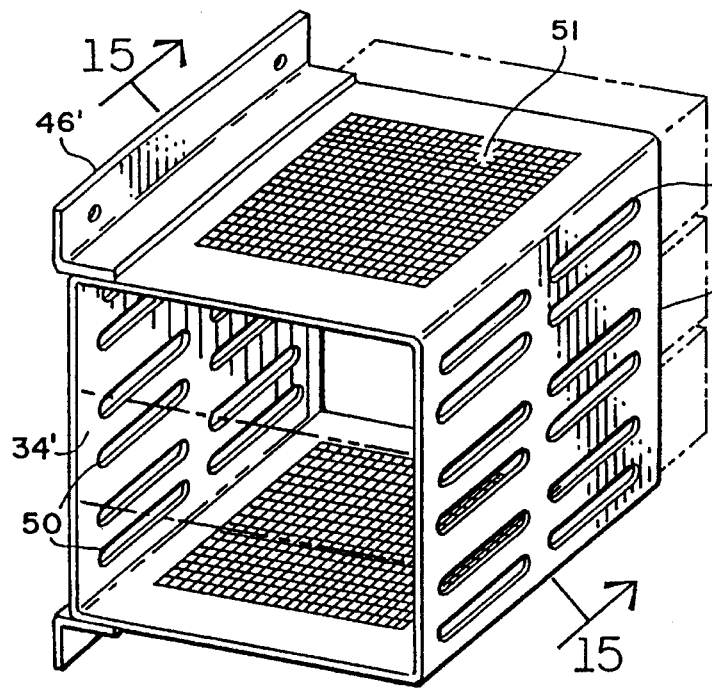
FIG. 14 is a perspective view of the storage device housing adapted for the vertical organizer.
Figure 15:
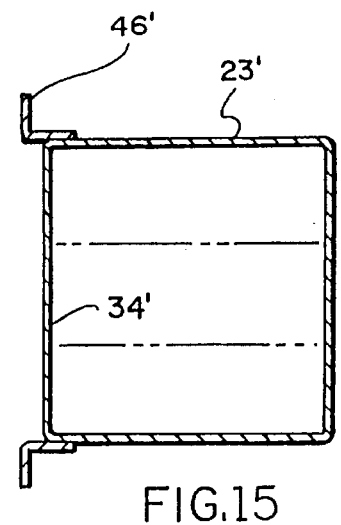
FIG. 15 is a transverse sectional view of the housing shown in FIG. 14 taken along section line 15—15 of FIG. 14 and in reduced scale.

The vertical organizer 10' is best illustrated in FIGS. 12 and 13. There it will be seen that ventilation for the entire assembly interiorly of the vertical organizers 10' is provided by slots 50' on the sides of the chassis 11'. Additional ventilation is provided in the patch panel 28' by means of vent portion 40'. The ventilation is carried further through to the patch panel 28' from the rear interface panel 14'. Screens 51' are desirably on the top and bottom of the device enclosures 23'. There it will be seen that the vertical organizer 10' stores the auxiliary storage devices 22 in two vertical stacks of three each. Access is by opening the access panel 12' revealing the chassis 11' and its contents in substantially the same orientation as the horizontal chassis 10. Perhaps the only difference, and in form but not substance, is the orientation of the housing for auxiliary storage devices 23' in which the mounting flanges 46' are opposed to each other vertically as distinguished from the horizontal organizer 10 in which the mounting flanges 46 (see FIG. 11) are secured to the spacer 16 horizontally. In each instance, however, they are spaced from the enclosure bottom 34, 34'. The principal difference being in that the vent slots 50' are on the vertical faces in the vertical organizer 10', whereas they are on the horizontal faces of the horizontal enclosure 23. A screen vent 55' is optionally provided on those faces of the enclosure 23' which do not have the slots 50, 50'. To be noted also in FIG. 15 is that the body portion of the device enclosure 23' is essentially tubular and can be formed by bending a single sheet, or by other means known in the art just so that it totally encapsulates the auxiliary storage devices 22, and permits the securement of the same to the spacer 16'. The chassis 11' of the vertical organizer 16' is substantially identical to that of the horizontal one as depicted in FIG. 9. The two differ primarily in the device enclosure mounting, the slide mount, and the position and size of the imperforate cover required to inhibit settling dust.

The assembling of the horizontal organizer 10 proceeds from the foundation upwardly, the foundation of the entire structure being the chassis 11. After it is formed to its desired configuration, the spacer 16 is installed. It will be appreciated that the spacer 16 is pre-drilled in order to accommodate the various components of the computer assembly. It is also possible that the entire computer organizer can be shipped to the customer who, in turn, will remove the spacer 16, pre-drill the same for securing the various components, and then reassemble it into the organizer 10. This procedure is available also for the vertical organizer 10' since the spacer 16' in that structure is vertically secured to the chassis 11', and the enclosures 23' for the memory device 22 are spaced atop each other rather than side-by-side as with the horizontal embodiment of the organizer 10. In addition, in the vertical configuration, the power supply 19 and its internal blower as well as the daughter boards 21 are positioned in engagement with the interface panel 14. This is as shown primarily in FIG. 13.

While the two embodiments of the organizers 10, 10' have been shown in the environment of a desk 1, this is not mandatory. The same can be located in various areas of a work station, or in a remote location if need be. What is important is that the computer components can be readily accessed by opening the closure door 12, 12', the auxiliary storage devices 22 immediately accessed for use. Alternatively, should there be a necessity to remove any of the auxiliary storage devices 22 from its assembly, the housing 23, and 23' is removed with its contained auxiliary storage devices 22 by disengaging the screws which are secured through the mounting flanges 46, 46' of the housing 23, 23' for the auxiliary storage devices. In a similar fashion, the mother board 20 and daughter boards 21 can be removed, or if the mother board does not require attention, the daughter boards 21 can be independently removed. All of the above are achieved by first removing the cover 24 after which time the bulk of the interior components are readily accessible for service.

The vertical organizer 10' as shown in FIG. 16 is assembled in much the same fashion. The chassis 11' has an imperforate upper portion 52 with a depending cover element 54. The spacer 16' is secured to the bottom of the chassis 11' and the enclosures 23' are secured to the spacer 16' in much the same fashion as with the horizontal organizer. Similarly the electronic assembly 20' is secured to the spacer 16', and the power supply 19' secured in the rear portion for open communication with the rear interface panel 14'. Also to be noted in FIG. 13 is the provision for a cable mount arm assembly 15'.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A computer organizer for auxiliary storage device enclosure comprising, in combination, a U-shaped chassis having parallel sidewalls, a chassis base portion perpendicular to the sidewalls, a spacer comprising a flat imperforate member with means for spacing the same from the chassis base in parallel relationship to the base and overlying substantially all of the chassis base thereby defining an encapsulating chamber therebetween, an enclosure access frame spanning the forward portion of the chassis and secured to the chassis and having an opening therein to communicate with said auxiliary storage devices, housings for the auxiliary storage devices, means for removably securing said housings to the enclosure access frame and to the spacer, each such removable auxiliary storage device housing having parallel longitudinal support means for removably securing an auxiliary device therein with the insert portion of the device facing the opening in the access frame, means for mounting a circuit assembly behind of the devices and to the spacer, a patch panel, an interface panel proportioned to span the space between the rear side walls of the chassis and secured thereto and to the bottom of the chassis in electronic communication with the patch panel, said interface panel having apertures therein, at least one of which is proportioned to removably engage a power supply, an access panel hingedly secured to the lower forward portion of the base of the chassis and proportioned to overlie the enclosure frame and hinge to said chassis, and a cover for removable securement atop the rectangular area bounded by the sidewalls of the chassis, the forward enclosure frame, and the interface panel.

2. The computer organizer enclosure of claim 1, including, drawer slides secured thereto for slidably mounting the organizer.

3. The computer organizer enclosure of claim 1, said organizer having a rear portion spaced from the enclosure access frame, and a cable management arm assembly secured to the rear portion of the organizer to receive and manipulate cables extending to and from the organizer.

4. The computer organizer enclosure of claim 1, wherein, the sidewalls of said chassis have a longitudinal perforated area for ventilation.

5. The computer organizer enclosure of claim I, wherein, said auxiliary storage device housing is a tubular shaped member, said housing having means for ventilating the auxiliary devices.

6. A computer organizer enclosure for auxiliary storage devices comprising, in combination, a U-shaped chassis having parallel sidewalls and a bottom portion secured perpendicular to said sidewalls, a spacer comprising a flat uninterrupted member with means for spacing the same from the bottom portion of the chassis in parallel relationship thereto and substantially overlying all of the bottom of the chassis defining an encapsulating chamber therebetween, said spacer having sides, a front, and a rear, a frame having a lower portion and side portion spanning the forward portion of the chassis and secured at its lower portion to the bottom of the chassis and at its side portions to the sides of the chassis and having an opening therein to communicate with said auxiliary storage devices, a computer storage device housing having open ends, sides, and means for removably securing the storage device to the enclosure frame, said removable storage device housing having parallel longitudinal internally mounted support means for removably securing a storage device in said housing with the insert portion of the device facing the opening in the frame, means for mounting an electronic circuit behind the auxiliary storage device housings on one side of the space between the housings and the rear portion of the spacer, an interface panel proportioned to span the space between the rear side walls of the chassis and secured thereto, said interface panel having apertures therein, at least one of which is proportioned to removably engage a power supply.

7. The computer organizer of claim 6, wherein:

an access panel hingedly secured to the lower forward portion of the base of the chassis and proportioned to overlie the enclosure frame and hinge to said chassis.

8. The computer organizer of claim 6, wherein:

an imperforate cover for removable securement atop the rectangular area bounded by the sidewalls of the chassis, the forward enclosure frame, and the interface panel.

9. The computer organizer of claim 6, wherein, said sidewalls of the chassis have drawer slides secured thereto for mounting interiorly of a drawer of a framework.

10. The computer organizer of claim 6, wherein, a cable management arm assembly is secured to the rear portion thereof to receive and manipulate cables extending to and from the organizer.

11. The computer organizer of claim 6, wherein, the sidewalls of said chassis have a longitudinal perforated area for ventilation.

12. The computer organizer of claim 6, wherein, said auxiliary storage device enclosure comprise tubular member, said tubular member having sidewalls which are parallel and a top which is ventilated, said sidewalls terminating in outwardly depending flanges having means for removably securing the same to the spacer.

13. A computer organizer for auxiliary storage devices comprising, in combination, a U-shaped chassis having a front, rear, and parallel sidewalls and a bottom perpendicular to the sidewalls, a spacer having a front, a rear, and opposed sides comprising a flat substantially uninterrupted and imperforate member with means for spacing the same from the bottom of the chassis in parallel relationship thereto and overlying substantially all of the chassis bottom thereby defining an encapsulating chamber beneath the spacer and above the chassis bottom, an enclosure frame spanning the front portion of the chassis and secured to the chassis and at its side portions to the sidewalls of the chassis and having an opening therein to communicate with said auxiliary storage devices, a tubular auxiliary device housing having open ends, lower edge portions, and means for removably securing the housing at its lower edge portions to the spacer, each such removable auxiliary storage device housing having support means for removably securing storage devices therein, a drive housing, an electronic circuit assembly secured to a device housing on one side of the space between the drive housings and the rear of the spacer, an interface panel proportioned to span the rear side of the chassis and secured thereto, said interface panel having apertures therein, at least one of which is proportioned to removably engage a power supply, an access panel hingedly secured to the lower front portion of the base of the chassis and proportioned to overlie the enclosure and hinge to said chassis, and a cover for removable securement atop the rectangular area bounded by the sidewalls of the chassis, the forward mounting enclosure frame, and the interface panel.

14. The computer organizer of claim 13, wherein, said sidewalls of the chassis have drawer slides secured thereto for mounting interiorly of a drawer of a desk drawer.

15. The computer organizer of claim 13, wherein, a cable management arm assembly is secured to the rear portion of the chassis to receive and manipulate cables extending to and from the organizer.

16. The computer organizer of claim 13, wherein, the sidewalls of said chassis have a longitudinal perforated area for ventilation.

17. The computer organizer of claim 13, wherein, said drive enclosures comprise a tubular shaped member, said tubular U-shaped member having sidewalls which are parallel and a top and bottom, said sidewalls terminating in outwardly depending flanges at the bottom having means for removably securing the same to the spacer.

18. A computer organizer for auxiliary storage devices has an enclosure, comprising in combination, a U-shaped chassis having parallel sidewalls, perpendicular to a chassis base portion, which base portion is perpendicular to the sidewalls, a spacer comprising a flat, imperforate, substantially uninterrupted rectangular member having the same shape as to fit in complimentary spaced relationship with the base portion of the chassis, and means for mounting the spacer to the bottom of the chassis base in spaced relationship thereto thereby presenting an uninterrupted crawl space to receive screw ends and other fastener ends of a storage device secured to the spacer which spacer, is secured to the bottom of the chassis, an access panel secured to the forward portion of the chassis and proportioned to overlie the chassis area defined by the sidewalls and the base, and a cover for removable securement atop the rectangular area bounded by the sidewalls of the chassis, the forward portion of the chassis, and the access panel.

19. In the computer organizer of claim 18 above, housings for the auxiliary storage devices, and means for removably securing said housings to the spacer.

* * * * *